(12) United States Patent
Richman et al.

(10) Patent No.: US 11,588,848 B2
(45) Date of Patent: Feb. 21, 2023

(54) SYSTEM AND METHOD FOR SUSPENDING A COMPUTING DEVICE SUSPECTED OF BEING INFECTED BY A MALICIOUS CODE USING A KILL SWITCH BUTTON

(71) Applicant: Bank of America Corporation, Charlotte, NC (US)

(72) Inventors: Adam B. Richman, Charlotte, NC (US); William Thomas Stranathan, Charlotte, NC (US); Anusha Ravulapati, Aurora, IL (US); Kenneth Aaron Kaye, Highlands Ranch, CO (US); Nikhil Harish Sanil, Charlotte, NC (US); Alice Yali Chang, Alexandria, VA (US); Brady Prentice Merkel, Jacksonville Beach, FL (US)

(73) Assignee: Bank of America Corporation, Charlotte, NC (US)

( * ) Notice: Subject to any disclaimer, the term of this patent is extended or adjusted under 35 U.S.C. 154(b) by 164 days.

(21) Appl. No.: 17/141,307

(22) Filed: Jan. 5, 2021

(65) Prior Publication Data
US 2022/0217155 A1    Jul. 7, 2022

(51) Int. Cl.
G06F 21/00    (2013.01)
H04L 9/40    (2022.01)
G06F 21/56    (2013.01)
G06F 21/52    (2013.01)

(52) U.S. Cl.
CPC ........... *H04L 63/145* (2013.01); *G06F 21/52* (2013.01); *G06F 21/56* (2013.01); *G06F 2221/033* (2013.01); *G06F 2221/2143* (2013.01)

(58) Field of Classification Search
CPC .............. H04L 63/145; H04L 63/1408; H04L 63/1441; H04L 63/1433; G06F 21/52; G06F 21/56; G06F 2221/033; G06F 2221/2143; G06F 21/562
See application file for complete search history.

(56) References Cited

U.S. PATENT DOCUMENTS

| | | |
|---|---|---|
| 6,941,478 B2 | 9/2005 | Card et al. |
| 7,080,408 B1 | 7/2006 | Pak et al. |
| 7,134,142 B2 | 11/2006 | Smith |
| 7,299,361 B1 | 11/2007 | Kim et al. |
| 7,331,062 B2 | 2/2008 | Alagna et al. |
| 7,343,624 B1 | 3/2008 | Rihn et al. |
| 7,533,407 B2 | 5/2009 | Lewis et al. |

(Continued)

*Primary Examiner* — Ghazal B Shehni

(57) ABSTRACT

A system for suspending a computing device suspected of being infected by a malicious code is configured to receive a signal to initiate a suspension procedure of the computing device. The system captures states of instructions that are being executed by a processor of the computing device, where the instructions comprise the malicious code. The system prioritizes the operation of a kill switch button over the instructions being executed by the processor. The system sends notification signals to servers managing a user account associated with a user currently logged in at the computing device, indicating that the computing device is suspected of having been infected by the malicious code. In response to sending the notification signals to the servers, the user account is suspended. The system terminates network connections of the computing device such that the computing device is disconnected from other devices.

18 Claims, 2 Drawing Sheets

(56) References Cited

U.S. PATENT DOCUMENTS

| | | |
|---|---|---|
| 7,562,208 B1 | 7/2009 | Reed et al. |
| 7,712,136 B2 | 5/2010 | Sprosts et al. |
| 7,827,545 B2 | 11/2010 | Choe et al. |
| 8,046,836 B2 | 10/2011 | Isokawa |
| 8,180,834 B2 | 5/2012 | Kay et al. |
| 8,281,367 B2 | 10/2012 | Takahashi |
| 8,359,464 B2 | 1/2013 | Shimada |
| 8,539,582 B1 | 9/2013 | Aziz et al. |
| 8,590,043 B2 | 11/2013 | Huddleston |
| 8,621,610 B2 | 12/2013 | Oberheide et al. |
| 8,644,309 B2 | 2/2014 | Fujita |
| 8,793,758 B2 | 7/2014 | Raleigh et al. |
| 8,806,635 B2 | 8/2014 | Bennet |
| 8,806,639 B2 | 8/2014 | Mohler |
| 8,914,886 B2 | 12/2014 | Bishop et al. |
| 8,924,577 B2 | 12/2014 | Choe |
| 9,021,253 B2 | 4/2015 | Shimada |
| 9,027,135 B1 | 5/2015 | Aziz |
| 9,049,235 B2 | 6/2015 | Liebmann et al. |
| 9,111,121 B2 | 8/2015 | Pedersen et al. |
| 9,130,822 B2 | 9/2015 | Cooper |
| 9,319,429 B2 | 4/2016 | Onodera |
| 9,417,866 B2 | 8/2016 | Morley et al. |
| 9,509,713 B2 | 11/2016 | Bennett |
| 9,516,048 B1 | 12/2016 | Emigh et al. |
| 9,519,782 B2 | 12/2016 | Aziz et al. |
| 9,602,508 B1 | 3/2017 | Mahaffey et al. |
| 9,736,179 B2 | 8/2017 | Ismael |
| 9,800,603 B1 | 10/2017 | Sidagni |
| 9,967,278 B2 | 5/2018 | Jevans et al. |
| 10,068,091 B1 | 9/2018 | Aziz et al. |
| 10,474,813 B1 | 11/2019 | Ismael |
| 10,484,872 B2 | 11/2019 | Haugen et al. |
| 10,510,228 B2 | 12/2019 | Baker et al. |
| 10,540,176 B2 | 1/2020 | Jackson et al. |
| 10,571,284 B2 | 2/2020 | Joao et al. |
| 10,623,435 B2 | 4/2020 | Jevans et al. |
| 2004/0015726 A1 | 1/2004 | Szor |
| 2004/0098607 A1 | 5/2004 | Alagna et al. |
| 2004/0193896 A1* | 9/2004 | Kaneko ............ G06F 21/566 713/188 |
| 2005/0267954 A1 | 12/2005 | Lewis et al. |
| 2006/0161988 A1 | 7/2006 | Costea et al. |
| 2007/0198525 A1 | 8/2007 | Chatterjee et al. |
| 2008/0209561 A1* | 8/2008 | Alagna ............ G06F 21/554 726/23 |
| 2011/0055588 A1* | 3/2011 | DeHaan ............ G06F 1/3209 713/189 |
| 2014/0013315 A1 | 1/2014 | Genevski et al. |
| 2018/0101678 A1* | 4/2018 | Rosa .................. G06F 21/32 |
| 2018/0248896 A1 | 8/2018 | Challita et al. |
| 2019/0007204 A1* | 1/2019 | Field .................. H04L 9/3226 |
| 2021/0075825 A1* | 3/2021 | Davis ................ H04L 63/1416 |

\* cited by examiner

SYSTEM AND METHOD FOR SUSPENDING A COMPUTING DEVICE SUSPECTED OF BEING INFECTED BY A MALICIOUS CODE USING A KILL SWITCH BUTTON

TECHNICAL FIELD

The present disclosure relates generally to information security, and more specifically to a system and method for isolating a computing device suspected of being infected by a malicious code using a kill switch button.

BACKGROUND

It can be a slow process to terminate dependent systems from a computing device that is discovered to be infected by a malicious code, where the malicious code is associated with a software application, such as malware. It is also difficult to terminate access to user accounts and revoke privileges associated with user accounts logged in at the computing device infected by the malicious code. It is also difficult to terminate network connections between the infected computing device and systems that are connected to the infected computing device through a network. Current information security and data loss prevention technologies are not configured to provide a reliable solution to suspend a computing device that is suspected of being infected by a malicious code.

SUMMARY

Current information security and data loss prevention technologies may not be configured to suspend a computing device that is suspected to be infected by a malicious code. The present disclosure contemplates systems and methods for suspending a computing device suspected of being infected by a malicious code using a kill switch button. Malicious code may be associated with malware that is programmed to perform malicious activities, such as an unauthorized access to a memory, data exfiltration, destruction, modification, degrading the performance of the computing device, etc.

Upon suspecting that the computing device is infected by a malicious code, the kill switch button can be triggered to initiate putting the infected computing device in a suspended state. For example, an end-user can trigger the kill switch button. For instance, when the end-user detects suspicious behaviors from the computing device, the end-user may trigger the kill switch button. The suspicious behaviors may correspond to the computing device behaving in an unexpected manner, such as windows, folders, or websites popping up without being instructed, the speed of a processor and/or memory of the computing device is slows unexpectedly, among other unexpected behaviors.

Once the kill switch button is triggered, states of instructions currently being processed or executed by a processor of the computing device are captured. These instructions comprise the malicious code which has caused the computing device to behave in an unexpected manner. The captured states of the instructions currently being processed by the process are stored in a memory of the computing device. This information may later be used in investigations for determining a source of the malicious code. The disclosed system prioritizes the kill switch button over all other running processes, and demotes the other running processes. The reasons for this process include 1) the suspension of the computing device gets executed without interruptions from other running processes and 2) the malicious code is suppressed and thus cannot take over and spread to other running processes, systems, devices, and databases that are communicatively coupled with the computing device. The disclosed system initiates the suspension of user accounts logged in at the computing device. For example, suspension of user accounts for logging to websites, shared networks, email accounts, etc., associated with the user is initiated. The disclosed system initiates the termination of network connections of the computing device. As such, the disclosed system isolates the computing device and confines the malicious code in the computing device. Therefore, the infected computing device is put in a suspended state.

In an embodiment, a system for suspending a computing device suspected of being infected by a malicious code comprises a memory and a processor. The memory is operable to store a software instruction that is executed when a kill switch button is triggered to initiate a suspension procedure of the computing device. The suspension procedure is initiated when the computing device is suspected of being infected by a malicious code. When the malicious code is executed, the computing device becomes vulnerable to security threats comprising an unauthorized access to the memory.

The processor is operably coupled with the memory. The processor is configured to receive, from a user, a triggering signal to initiate the suspension procedure. The processor captures one or more states of one or more instructions that are being executed by the processor, where the one or more instructions comprise the malicious code. The processor prioritizes an operation of the kill switch button over the one or more instructions that are being executed by the processor. The processor sends one or more notification signals to one or more servers managing a user account associated with the user currently logged in at the computing device, indicating that the computing device is suspected of having been infected by the malicious code. In response to sending the one or more notification signals to the one or more servers, the user account is suspended. The processor terminates network connections of the computing device such that the computing device is disconnected from other devices.

The disclosed system provides several practical applications and technical advantages which include: 1) technology that utilizes a kill switch button to suspend a computing device suspected of being infected with a malicious code in "one step" or "one-click"; 2) technology that provides the kill switch button, where the kill switch button may comprise one or more of a physical button, a software button, and a virtual button; 3) technology that saves states of currently running instructions by a processor of the infected computing device for further analysis for determining a source of the malicious code; 4) technology that suspends user accounts and privileges associated with the user accounts logged in at the infected computing device; and 5) technology that disables restarting the infected computing device, for example, by erasing a memory address to boot cycle instructions without which the computing device cannot be rebooted.

As such, the system described in this disclosure may improve the information security and data loss prevention technologies by providing a kill switch button for a computing device that is suspected of being infected by a malicious code. The disclosed system may be integrated into a practical application of improving the underlying operations of the infected computing device by suppressing the execution of the malicious code so that uninfected systems, data, and processes at the computing device are not infected.

This, in turn, provides an additional practical application of securing data stored in the memory of the infected computing device. As such, the data stored in the memory of the infected computing device is secured from being accessed, modified, exfiltrated, or destroyed.

The disclosed system may be further integrated into an additional practical application of confining the malicious code in the infected computing device so that devices, servers, and databases that are communicatively coupled with the infected computing device are protected from being infected by the malicious code.

This, in turn, provides an additional practical application of improving operations of those devices, servers, and databases. Furthermore, data stored in memories of the devices, servers, and databases communicatively coupled with the infected computing device is protected from being infected by the malicious code, and cannot be accessed, modified, exfiltrated, or destroyed.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
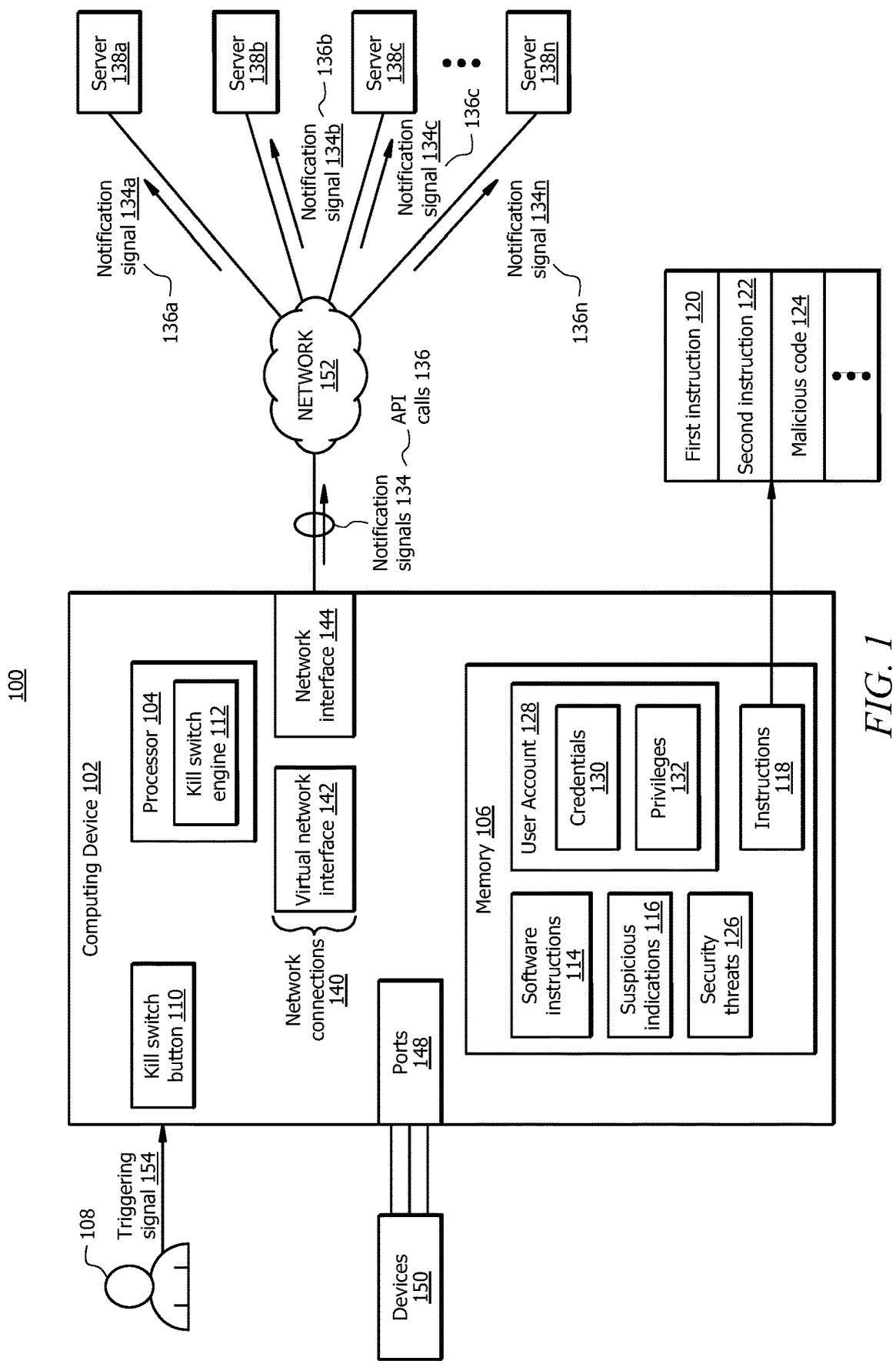
FIG. 1 illustrates an embodiment of a system configured to suspend a computing device suspected of being infected by a malicious code using a kill switch button.

FIG. 1 illustrates one embodiment of a system 100 that is configured to suspend or quarantine a computing device 102 that is suspected of being infected by a malicious code 124 using a kill switch button 110. In one embodiment, system 100 comprises the computing device 102, user 108, network 152, and one or more servers 138. The computing device 102 comprises a processor 104 in signal communication with a memory 106. Memory 106 comprises software instructions 114 that when executed by the processor 104 cause the processor 104 to perform one or more functions described herein. For example, when the kill switch button 110 is triggered, the processor 104 executes the software instructions 114 to carry out the operation of a kill switch engine 112 and put the computing device 102 in a suspended or quarantine state. The corresponding description below includes a brief description of a series of steps performed by the system 100 to put the computing device 102 in a suspended state.

In general, system 100 (e.g., via the user 108) detects one or more suspicious indications 116 indicating that the computing device 102 may be infected by a malicious code 124. The malicious code 124 may cause the computing device 102 to behave in an unexpected way (i.e., to exhibit suspicious indications 116). For example, suspicious indications 116 may include degradation in the performance of the processor 104. For instance, the CPU utilization percentage of the processor 104 shows it is above a threshold percentage (e.g., above 80%) while the speed of the processor 104 slows unexpectedly. In response to detecting one or more suspicious indications 116, the kill switch button 110 is triggered to initiate the suspension or quarantine procedure, and the computing device 102 is put in a suspended state. The system 100 (via the kill switch engine 112) captures a snapshot of the memory 106. In this process, the kill switch engine 112 captures states of instructions 118 that are being processed by the processor 104. The kill switch engine 112 prioritizes the operation of the kill switch button 110 over all other processes currently being run by the processor 104. The kill switch engine 112 sends one or more notification signals 134 to one or more servers 138 managing a user account 128 associated with the user 108, where the one or more notification signals 134 indicate that the computing device 102 is suspected of being infected with the malicious code 124. In response, the user account 128 is suspended. The kill switch engine 112 terminates networking connections 140 associated with the computing device 102 such that the computing device 102 is disconnected from other devices, e.g., other computing devices 102, servers (e.g., servers 138), databases, domains, etc. Therefore, the malicious code 124 is confined in the computing device 102, the likelihood of infecting other devices is minimized, and the computing device 102 is put in a suspended state. In other embodiments, system 100 may not have all of the components listed and/or may have other elements instead of, or in addition to, those listed above.

Computing device 102 is generally any device that is configured to process data and interact with users 108. Examples of computing device 102 include, but are not limited to, a personal computer, a desktop computer, a workstation, a server, a laptop, a tablet computer, a mobile phone (such as smartphones), etc. In a particular example, the computing device 102 may be a desktop computer that is associated with an organization, and is connected to other computing devices 102 via the network 152.

Processor 104 comprises one or more processors operably coupled to the memory 106. The processor 104 is any electronic circuitry including, but not limited to, state machines, one or more central processing unit (CPU) chips, logic units, cores (e.g. a multi-core processor), field-programmable gate array (FPGAs), application-specific integrated circuits (ASICs), or digital signal processors (DSPs). The processor 104 may be a programmable logic device, a microcontroller, a microprocessor, or any suitable combination of the preceding. The one or more processors are configured to process data and may be implemented in hardware or software. For example, the processor 104 may be 8-bit, 16-bit, 32-bit, 64-bit, or of any other suitable architecture. The processor 104 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. The one or more processors are configured to implement various instructions. For example, the one or more processors are configured to execute instructions (e.g., software instructions 114) to implement the kill switch engine 112. In this way, processor 104 may be a special-purpose computer designed to implement the functions disclosed herein. In an embodiment, the processor 104 is implemented using logic units, FPGAs, ASICs, DSPs, or any other suitable hardware. The processor 104 is configured to operate as described in FIGS. 1 and 2. For example, the processor 104 may be configured to perform one or more steps of method 200 as described in FIG. 2.

Memory 106 may be volatile or non-volatile and may comprise a read-only memory (ROM), random-access memory (RAM), ternary content-addressable memory (TCAM), dynamic random-access memory (DRAM), and static random-access memory (SRAM). Memory 106 may be implemented using one or more disks, tape drives, solid-state drives, and/or the like. Memory 106 is operable to store the software instructions 114, instructions 118, user accounts 128, and/or any other data or instructions. The software instructions 114 may comprise any suitable set of instructions, logic, rules, or code operable to execute the processor 104.

Kill switch button Kill switch button 110 is generally a button that is operably coupled with the kill switch engine 112. When the kill switch button 110 is triggered, the kill switch engine 112 is implemented by the processor 104 to execute the software instructions 114 and thus put the computing device 102 in a suspended state. In other words, upon activation of the kill switch button 110, the processor 104 executes the software instructions 114 to carry out the operation of the kill switch engine 112 as described further below.

Therefore, upon activation of the kill switch button 110, data stored in the memory 106 that is not yet corrupted or infected by the malicious code 124 is secured and saved from being corrupted or infected. Furthermore, data stored in the memory 106 is secured such that the data cannot be accessed, exfiltrated, destroyed, or modified. Furthermore, the malicious code 124 is confined in the memory 106, and not spread to other computing devices 102, servers 138, databases, domains, etc., thought the network 152.

Malicious code 124 may be associated with a malware that is programmed to perform malicious activities, such as an unauthorized access to the memory, data exfiltration, destruction, modification, degrading the performance of the computing device 102, etc. As such, the malicious code may pose security threats 126 to the computing device 102 including an unauthorized access to the memory, data exfiltration, destruction, modification, degrading the performance of the computing device 102, etc. Malware may include, but is not limited to, spyware, rootkits, password stealers, spam, sources of phishing attacks, sources of denial-of-service-attacks, viruses, loggers, Trojans, adware, or any other digital content that produces malicious activities. When the malicious code 124 is executed, the computing device 102 becomes vulnerable to security threats 126 listed above, among others. In other words, the malicious code 124 may pose security threats 126 to the computing device 102 and other devices that are communicatively coupled with the computing device 102.

Although FIG. 1 illustrates the kill switch button 110 within the computing device 102, it should be understood that the system 100 can use different embodiments of the kill switch button 110. For example, the kill switch button 110 may be positioned outside of the computing device 102. In another example, the kill switch button 110 may be associated with another device, and be triggered to put the computing device 102 in a suspended state. The corresponding description below describes various embodiments of the kill switch button 110.

In one embodiment, the kill switch button 110 comprises a physical or hardware button. For example, the physical kill switch button 110 may be positioned adjacent to the computing device 102. The physical kill switch button 110 can be coupled to the computing device 102 by any suitable medium. For example, the kill switch button 110 may be hardwired to the computing device 102. In another example, the kill switch button 110 may be wirelessly coupled to the computing device 102, such as WiFi or other methods of wireless communication. In this embodiment, the user 108 can trigger the kill switch button 110, for example, by pressing down or turning the kill switch button 110.

In an alternative embodiment, the kill switch button 110 comprises a software or digital button. The software kill switch button 110 may be associated with a software application that is installed on the computing device 102. For example, the user 108 can trigger the kill switch button 110 by clicking on the kill switch button 110 on a graphical user interface of the software application displayed on a monitor of the computing device.

In an alternative embodiment, the kill switch button 110 comprises a virtual button. In one example, the kill switch button 110 may act as a virtual button to a second computing device 102 that is communicatively coupled to the first computing device 102 via network 152. For example, assume that the user 108 is accessing the second computing device 102 from the first computing device 102 through network 152. When one or more suspicious indications 116 are detected on the second computing device 102, the user 108 can trigger the kill switch button 110 for the second computing device 102 which causes the second computing device 102 to be put in a suspended state. In another example, the kill switch button 110 may be triggered to put a virtual machine in a suspended state, where the virtual machine is being hosted by the computing device 102. The virtual machine may be a virtualized representation of a computing device (e.g., a second computing device 102). For example, the virtual machine may be a guest operating system, various emulated systems, such as servers, computing devices, and the like. In one example, the virtual machine may be accessible by a virtual network interface 142. In another example, the virtual machine may be accessed by a software application that acts as an interface layer between the computing device 102 and the virtual machine. When one or more suspicious behaviors 116 are detected on the virtual machine, the kill switch button 110 can be triggered to put a virtual machine in a suspended state. The corresponding description below describes the operation of the kill switch engine 112.

Kill Switch Engine

Kill switch engine 112 may be implemented by the processor 104 executing the software instructions 114 to put the computing device 102 in a suspended state. The kill switch engine 112 is operably coupled with the processor 104, the memory 106, networking connections 140, and ports 148.

Triggering the Kill Switch Button

In one embodiment, the kill switch button 110 may be triggered by the user 108. For example, when the user 108 detects one or more suspicious indications 116 from the computing device 102, user 108 can trigger the kill switch button 110 by sending a triggering signal 154 to put the computing device 102 in a suspended state.

Some examples of the suspicious indications 116 may include 1) degradation in the performance of the processor 104, for example, the CPU utilization percentage is above a threshold percentage (e.g., above 80%) but the speed of the processor 104 slows unexpectedly; 2) degradation in the performance of the memory 106, for example, the memory utilization percentage is above a threshold percentage (e.g., above 80%) but the speed of the memory 106 slows unexpectedly; 3) websites, notifications, folders popping up without being instructed; 4) a cooling fan in the computing device 102 is spinning above a threshold round per second indicating that at least one of the processor 104 and memory 106 is heating up (e.g., their temperature is above a threshold value), among other unexpected behaviors.

The suspicious indications 116 may correspond to the computing device 102 behaving in an unexpected manner. Some examples that would cause the computing device 102 to behave in an unexpected manner may include opening a suspicious email attachment (e.g., a spam email attachment), browsing a suspicious website, plugging an external device (such as a memory drive) that is infected with the malicious code 124 to the computing device 102, accessing a file infected with the malicious code 124 on a shared network, etc.

In an alternative embodiment, triggering the kill switch button 110 may be computerized. As such, the kill switch button 110 may be triggered by the processor 104. For example, when the processor 104 detects that any of the suspicious indications 116 from the computing device 102, it may trigger the kill switch button 110. In another example, the processor 104 may send a notification to the user 108 that the computing device 102 is exhibiting one or more suspicious behaviors 116. The processor 104, for example, may pop up a notification message on a monitor of the computing device 102, indicating that the computing device is exhibiting one or more suspicious behaviors 116. The user 108 may confirm (or override) triggering the kill switch button 110.

Taking a Snapshot of the Memory

The kill switch engine 112 is further configured to capture states of instructions 118 that are currently being processed by the processor 104. In other words, the kill switch engine 112 takes a snapshot of the memory 106. As illustrated in FIG. 1, instructions 118 comprise a first instruction 120, a second instruction 122, the malicious code 124, among other instructions 118.

Capturing the states of the instructions 118 may correspond to capturing a particular state of each instruction 118 during the processing of an instruction cycle of that instruction 118. Instructions 118 may be at different stages of their corresponding instruction cycles. For example, the first instruction 120 may be in a fetch stage where it is being fetched from the memory 106. As such, the kill switch engine 112 captures that the first instruction 120 is at the fetch stage. In another example, the second instruction 122 may be in an execute stage where it is being executed by the processor 104. As such, the kill switch engine 112 captures that the second instruction 122 is at the execute stage. The kill switch engine 112 further captures that the malicious code 124 is being executed by the processor 104 causing the processor 104 to behave in an unexpected manner as described above. The kill switch engine 112 performs the same process for other instructions 118. The kill switch engine 112 stores the captured snapshot of the memory 106 in a location in the memory 106.

Prioritizing the Kill Switch Button

The kill switch engine 112 is further configured to prioritize the operation of the kill switch button 110 over all other currently running processes at the processor 104, and de-prioritize the other running processes. The other running processes may be associated with the instructions 118. In other words, the kill switch engine 112 prioritizes itself over all other currently running processes at the processor 104, and de-prioritize the other running processes. In this process, the kill switch engine 112 elevates its priority to the top of the list of running processes at the processor 104, and demoting or suppressing all other running processes. This causes the processor 104 to prioritize executing the software instructions 114 over the instructions 118.

In one embodiment, the kill switch engine 112 may prioritize itself over the other running processes by setting its priority configuration to the highest rank, and setting priority configurations associated with the other running processes to the lowest rank.

In another embodiment, the kill switch engine 112 may prioritize itself over the other running processes by allocating all the processing cores associated with the processor 104 to itself, and de-allocating the processing cores from the other running processes. The purposes of this process comprise 1) the kill switch engine 112 gets executed without interruptions from the other running processes and 2) the malicious code 124 cannot take over or corrupt the kill switch engine 112 (or the software instructions 114).

The kill switch engine 112 is configured to be a platform-independent or operating system. This is because prioritizing a process (here, the kill switch engine 112) in each operating system is different. For example, the process of prioritizing the kill switch button 110 in Windows operating system, is different from Linux, Ubuntu, and other operating systems.

Initiating Isolation of the Computing Device

The kill switch engine 112 is further configured to send one or more notification signals 134 to one or more servers 138 that are managing the user accounts 128 associated with the user 108. In other words, processor 104 executing the software instructions 114 further causes sending one or more notification signals 134 to one or more servers 138. In this process, the one or more servers 138 are notified that the computing device 102 is suspected of being infected by the malicious code 124.

The notification signals 134 may comprise an indication that the computing device 102 is suspected of being infected by the malicious code 124. The notification signals 134 may further comprise information about the user accounts 128 that are currently logged in to the computing device 102, such as their credentials 130 and privileges 132. For example, the user accounts 128 may comprise one or more of a user accounts 128 for logging in to different websites, user accounts 128 for accessing different shared networks, user accounts 128 for accessing email accounts, etc. In a particular embodiment, the notification signals 134 may comprise Application Programming Interface (API) calls 136.

In response to sending the notification signals 134 to the servers 138, appropriate actions may be taken to limit the user accounts 128 to minimize (or prevent) spreading the malicious code 124 to other systems, domains, databases, computing devices, etc., that are communicatively coupled with the computing device 102. For example, authorities or dedicated personnel monitoring the server 138 are notified about the computing device 102 may be being infected by the malicious code 124, and take the appropriate actions to limit the user accounts 128. The corresponding description below describes various examples of appropriate actions to limit the user accounts 128.

As an example, the kill switch engine 112 may send a first notification signal 134a or a first API call 136a to a first server 138a that is managing a first user account 128. In this example, the appropriate actions may comprise a suspension of login credentials 130 and revoking privileges 132 associated with the first user account 128. For example, assume that the first user account 128 is still logged in at the time of the activation of the kill switch button 110. Revoking the privileges 132 associated with the first user account 128 causes the user 108 to be logged out from the first user account 128.

As another example, the kill switch engine 112 may send a second notification signal 134b or a second API call 136b to a second server 138b that is managing a second user account 128. In this example, the appropriate actions may comprise a suspension of login credentials 130 and revoking privileges 132 associated with the second user account 128.

As another example, the kill switch button 110 may send a third notification signal 134c or a third API call 136c to a third server 128c that is managing security threat investigations to determine a source of the malicious code 124. In this example, the appropriate action may comprise initiating security threat investigations.

Although the present disclosure describes certain embodiment to notify one or more servers 138 (or authorities monitoring the servers 138) that the computing device 102 is suspected of being infected by the malicious code 124, one of ordinary skill in the art would appreciate other embodiments. For example, the kill switch button 110 may send other notification signals 134 or API calls 136 to other servers 138 that are dedicated to oversee other operations of the computing device 102.

Terminating Networking Connections of the Computing Device

The kill switch engine 112 is further configured to terminate networking connections 140 such that the computing device 102 is disconnected from other devices including other computing devices 102, servers (e.g., servers 138), databases, domains, etc. In this process, the kill switch engine 112 terminates physical networking connections 140 including physical network interfaces 144. For example, the kill switch engine 112 access configurations of the network interfaces 144 (from the memory 106) and disables them. As such, data cannot be communicated through Ethernet ports of the computing device 102.

The kill switch engine 112 also terminates virtual network interfaces 142 through which virtual machines may be connected to the computing device 102. The virtual network interfaces 142 may be associated with virtual network adaptors (installed on the computing device 102) that are configured to manage communication with virtual machines that are being hosted by the computing device 102 similar to that described above. For example, the kill switch engine 112 accesses configurations of the virtual network adaptors (from the memory 106) and disables them. Therefore, by terminating the network connections 140, malicious code 124 will be confined in the computing device 102.

In one embodiment, the kill switch engine 112 is further configured to halt an operation of the memory 106 such that communications between the memory 106 and the processor 104 are suspended. As an example, if the memory 106 comprises a Hard Disk Drive (HDD), the kill switch engine 112 causes the HDD to stop spinning. As another example, if the memory 106 comprises a Solid State Drive (SSD), the kill switch engine 112 causes the SDD to stop communicating data with the processor 104.

In one embodiment, the kill switch engine 112 is further configured to suspend communications between one or more devices 150 and one or more ports 148, where the one or more devices 150 are communicatively coupled to the one or more ports 148. For example, the kill switch engine 112 may access controller configurations associated with the ports 148 (from the memory 106) and disable them.

Each of the devices 150 may be any device that is configured to process and/or store data. In one Example, the device 150 may be a memory storage device, such as a USB drive and the like. In other examples, the device 150 may be similar to the computing device 102, such as a personal computer, a desktop computer, a workstation, a server, a laptop, a tablet computer, a mobile phone (such as smartphones), etc.

The one or more devices 150 may be communicatively coupled to the one or more ports 148 by any suitable medium, such as wired and wireless communications. For example, a first device 150 may be attached to a first port 148. For instance, the first device 150 may be a USB drive that is attached to the first port 148. In another example, a second device 150 may be wirelessly connected to a second port 148. For instance, the second device 150 may be a computing device, such as a mobile phone, that is wirelessly connected to the second port 148, for example via WiFi, Bluetooth, etc.

In one embodiment, the kill switch engine 112 is further configured to encrypt the memory 106 with an encryption key such that the memory 106 is inaccessible without being decrypted with a decryption key. The kill switch engine 112 may use any encryption technique to encrypt the memory 106, such as Advanced Encryption Standard (AES), Rivest-Shamir-Adleman (RSA), among others. For example, the kill switch engine 112, using an encryption technique, may generate an encryption key and encrypt the memory 106 with that encryption key.

However, encrypting the memory 106 could take a long time, thus, the kill switch engine 112 is further configured to erase a particular portion of the memory 106 in which instructions 118 to boot up the computing device 102 are stored. For example, the kill switch engine 112 may erase an address to a boot cycle operation from the memory 106 without which the boot cycle operation cannot be executed and the computing device 102 cannot boot up. As such, the computing device 102 cannot boot up or restart its operation once it is in a suspended or quarantine state.

Network interface 144 is configured to enable wired and/or wireless communications (e.g., via network 152). The network interface 144 is configured to communicate data between the computing device 102 and other devices, servers (e.g., servers 138), databases, systems, or domains. For example, the network interface 144 may comprise a WIFI interface, a local area network (LAN) interface, a wide area network (WAN) interface, a modem, a switch, or a router. The processor 104 is configured to send and receive data using the network interface 144. The network interface 144 may be configured to use any suitable type of communication protocol as would be appreciated by one of ordinary skill in the art.

Network 152 may be any suitable type of wireless and/or wired network including, but not limited to, all or a portion of the Internet, an Intranet, a private network, a public network, a peer-to-peer network, the public switched telephone network, a cellular network, a local area network (LAN), a metropolitan area network (MAN), a wide area network (WAN), and a satellite network. The network 152 may be configured to support any suitable type of communication protocol as would be appreciated by one of ordinary skill in the art.

Figure 2:
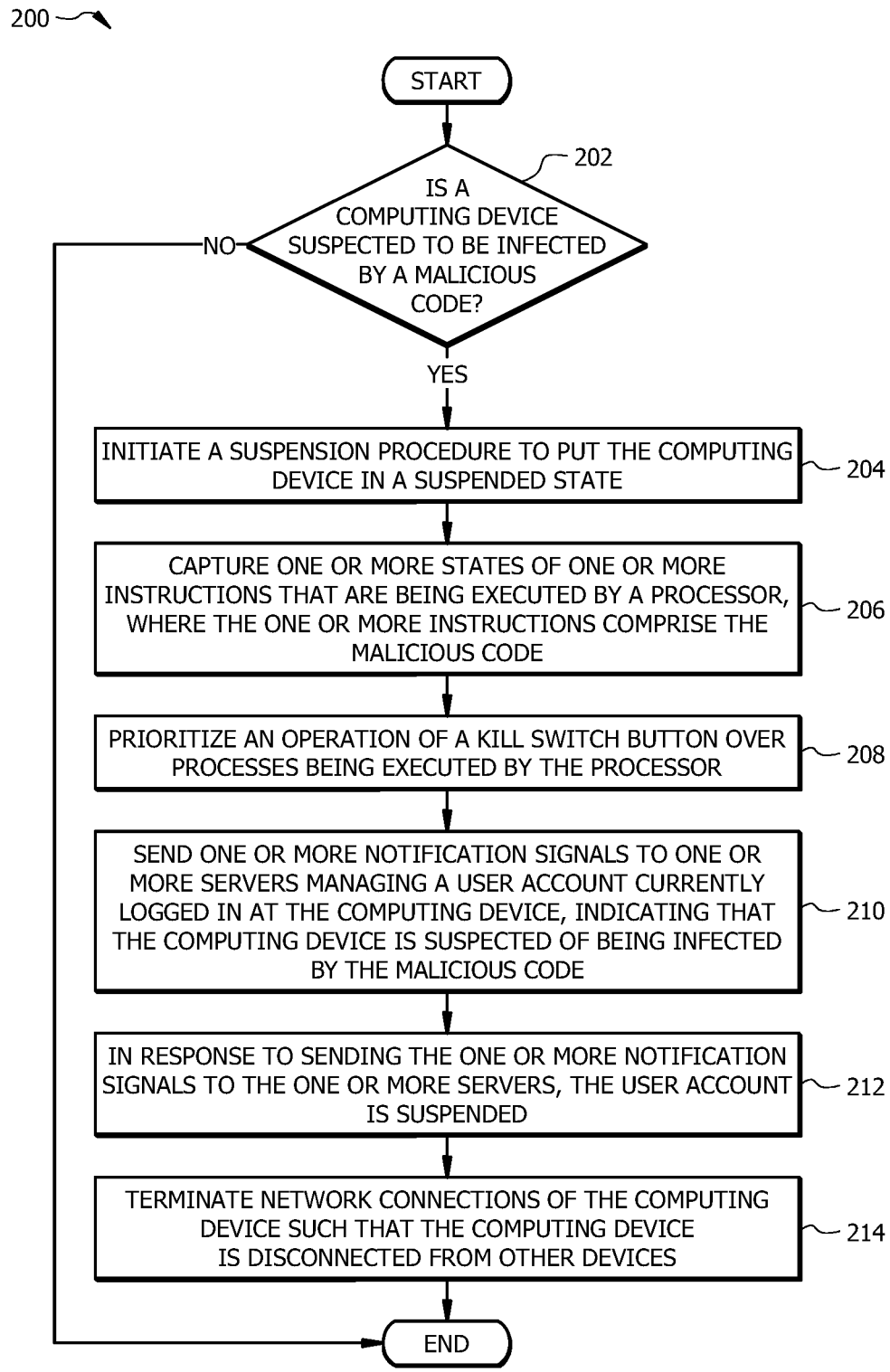
FIG. 2 illustrates an example flowchart of a method for suspending a computing device suspected of being infected by a malicious code using a kill switch button.

Example Method for Suspending a Computing Device Suspected on being Infected by a Malicious Code Using a Kill Switch Button FIG. 2 illustrates an example flowchart of a method 200 for putting a computing device 102 suspected of being infected by a malicious code 124 in a suspended state. Modifications, additions, or omissions may be made to method 200. Method 200 may include more, fewer, or other steps. For example, steps may be performed in parallel or in any suitable order. While at times discussed as the system 100, processor 104, kill switch button 110, kill switch engine 112, or components of any of thereof performing steps, any suitable system or components of the system may perform one or more steps of the method 200. For example, on or more steps of method 200 may be implemented, at least in part, in the form of software instructions 114 of FIG. 1, stored on non-transitory, tangible, machine-readable media (e.g., memory 106 of FIG. 1) that when run by one or more processors (e.g., processor 104 of FIG. 1) may cause the one or more processors to perform steps 202-214.

Method 200 begins at step 202 where it is determined whether the computing device 102 is suspected of being infected by the malicious code 124. If it is determined that the computing device 102 is not suspected of being infected by the malicious code 124, the method 200 is terminated. If, however, it is determined that the computing device 102 is suspected of being infected by the malicious code 124, the method 200 proceeds to step 204.

In one embodiment, the user 108 may determine whether the computing device 102 is suspected of being infected by the malicious code 124. For example, the user 108 may detect one or more suspicious indications 116 from the computing device 102. The one or more suspicious indications 116 indicate that the computing device 102 may be infected by the malicious code 124. The suspicious indications 116 may correspond to the computing device 102 behaving in an unexpected manner. If the user 108 detects one or more suspicious indications 116, the user 108 sends a triggering signal 154 to the kill switch button 110 to put the computing device 102 in a suspended state. Some examples of the suspicious indications 116 caused by being infected by the malicious code 124 are described in FIG. 1. For example, the suspicious indications 116 may include 1) degradation in the performance of the processor 104, for example, the CPU utilization percentage is above a threshold percentage (e.g., above 80%) but the speed of the processor 104 slows unexpectedly; 2) degradation in the performance of the memory 106, for example, the memory utilization percentage is above a threshold percentage (e.g., above 80%) but the speed of the memory 106 slows unexpectedly; 3) websites, notifications, folders popping up without being instructed; 4) a cooling fan in the computing device 102 is spinning above a threshold round per second indicating that at least one of the processor 104 and memory 106 is heating up (e.g., their temperature is above a threshold value), among other unexpected behaviors.

In another embodiment, the processor 104 may determine whether the computing device 102 is suspected of being infected by the malicious code 124. For example, the processor 104 may detect one or more suspicious behaviors or indications 116 from the computing device 102.

At step 204, the processor 104 initiates a suspension procedure to put the computing device 102 in a suspended state. In this process, the processor 104 implements the kill switch engine 112 by executing the software instructions 114. The kill switch engine 112 performs a series of steps to put the computing device 102 in a suspended state. These steps comprise steps 206 to 214 of method 200 as described below.

At step 206, the kill switch engine 112 captures one or more states of one or more instructions 118 that are being executed by the processor 104, where the one or more instructions 118 comprise the malicious code 124. In this process, the kill switch engine 112 captures a particular state of each instruction 118 during the processing of an instruction cycle of that instruction 118. For example, the kill switch engine 112 may capture that the first instruction 120 is in a fetch stage, the second instruction 122 is in an execute stage, the malicious code 124 is in an execute stage, etc.

The kill switch engine 112 may store the captured states of the instructions 118 in a location in the memory 106. This information may later be used in an investigation for determining a source of the malicious code 124, determining whether there is a security breach in any of the instructions 118, and determining whether a combination of the states of one or more instructions 118 caused the malicious code 124 to infect the computing device 102.

At step 208, the kill switch engine 112 prioritizes the operation of the kill switch button 110 over other processes being executed by the processor 104. In other words, the kill switch engine 112 prioritizes itself over all other currently running processes at the processor 104, and de-prioritize the other running processes. This causes the processor 104 to prioritize executing the software instructions 114 over the instructions 118.

For example, the kill switch engine 112 may prioritize itself over the other running processes by setting its priority configuration to the highest rank, and setting priority configurations associated with the other running processes to the lowest rank. In another example, the kill switch engine 112 may prioritize itself over the other running processes by allocating all the processing cores associated with the processor 104 to itself, and de-allocating the processing cores from the other running processes.

At step 210, the kill switch engine 112 sends one or more notification signals 134 to one or more servers 138 that are managing the user account 128 currently logged in at the computing device 102, indicating that the computing device 102 is suspected of being infected by the malicious code 124. In this process, the one or more servers 138 are notified that the computing device 102 is suspected of being infected with the malicious code 124. Some examples of the notification signals 134 being sent to servers 138 are described in FIG. 1 Some examples of the user account 128 may comprise user accounts for logging to websites, email accounts, shared networks, domains, etc.

At step 212, in response to sending the one or more notification signals 134 to the one or more servers 138, the user account 128 is suspended. For example, authorities monitoring the servers 138 may trigger the suspension of the credentials 130 associated with the user account 128. As such, the user 108 may no longer use their credentials 130, for example, to login to their corresponding accounts in websites, email accounts, shared networks, etc. In another example, authorities monitoring the servers 138 may trigger revoking the privileges 132 associated with the user account 128. As such, even if user 108 is logged in to their accounts at the time of the activation of the kill switch button 110, they will be logged out. In another example, authorities monitoring the servers 138 may trigger security threat investigations to determine a source of the malicious code 124.

At step 214, the kill switch engine 112 terminates network connections 140 such that the computing device 102 is disconnected from other devices, such as device (e.g., computing devices 102), servers (e.g., servers 138), systems, databases, virtual machines, etc. For example, the kill switch engine 112 terminates physical network interfaces 144 and virtual network interfaces 142 similar to that described in FIG. 1.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112(f) as it exists on the date of filing hereof unless the words "means for" or "step for" are explicitly used in the particular claim.

The invention claimed is:

1. A system for suspending a computing device suspected of being infected by a malicious code, comprising:
 a memory operable to store a software instruction that is executed when a kill switch button is triggered to initiate a suspension procedure, wherein:
  the suspension procedure is initiated when a computing device is suspected of being infected by a malicious code, and
  when the malicious code is executed, the computing device becomes vulnerable to security threats comprising an unauthorized access to the memory;
 a processor, operably coupled with the memory, configured to:
  receive, from a user, a triggering signal to initiate the suspension procedure;
  capture one or more states of one or more instructions that are being executed by the processor, wherein the one or more instructions comprise the malicious code;
  prioritize an operation of the kill switch button over the one or more instructions that are being executed by the processor such that the one or more instructions comprising the malicious code are suppressed;
  send one or more notification signals to one or more servers managing a user account associated with the user currently logged in at the computing device, indicating that the computing device is suspected of having been infected by the malicious code;
  in response to sending the one or more notification signals to the one or more servers, the user account is suspended;
  terminate network connections of the computing device such that the computing device is disconnected from other devices; and
  erase a particular portion of the memory in which boot up instructions are stored without which the computing device cannot be restarted.

2. The system of claim 1, wherein the kill switch button comprises at least one of a physical button, a software button, and a virtual button.

3. The system of claim 1, wherein the processor is further configured to halt an operation of the memory such that communications between the memory and the processor are suspended.

4. The system of claim 1, wherein the processor is further configured to suspend communications between one or more devices and one or more corresponding ports of the computing device, wherein the one or more devices are connected to the one or more corresponding ports.

5. The system of claim 1, wherein the processor is further configured to encrypt the memory with an encryption key such that the memory is inaccessible without being decrypted with a decryption key.

6. The system of claim 1, wherein capturing the one or more states of the one or more instructions that are being executed by the processor comprises capturing each particular state of each instruction from the one or more instructions during an execution of an instruction cycle of each instruction.

7. A method for suspending a computing device suspected of being infected by a malicious code, comprising:
 receiving, from a user, a triggering signal to initiate a suspension procedure, wherein:
  the suspension procedure is initiated when a computing device is suspected of being infected by a malicious code, and
  when the malicious code is executed, the computing device becomes vulnerable to security threats comprising an unauthorized access to a memory associated with the computing device;
 capturing one or more states of one or more instructions that are being executed by a processor associated with the computing device, wherein the one or more instructions comprise the malicious code;
 prioritizing an operation of a kill switch button over the one or more instructions that are being executed by the processor such that the one or more instructions comprising the malicious code are suppressed;
 sending one or more notification signals to one or more servers managing a user account associated with the user currently logged in at the computing device, indicating that the computing device is suspected of having been infected by the malicious code;
 in response to sending the one or more notification signals to the one or more servers, the user account is suspended;
 terminating network connections of the computing device such that the computing device is disconnected from other devices; and
 erasing a particular portion of the memory in which boot up instructions are stored without which the computing device cannot be restarted.

8. The method of claim 7, wherein the kill switch button comprises at least one of a physical button, a software button, and a virtual button.

9. The method of claim 7, further comprising halting an operation of the memory such that communications between the memory and the processor are suspended.

10. The method of claim 7, further comprising suspending communications between one or more devices and one or more corresponding ports of the computing device, wherein the one or more devices are connected to the one or more corresponding ports.

11. The method of claim 7, wherein sending the one or more notification signals to the one or more servers comprises at least one of:
sending a first notification signal to a first server managing a first user account associated with the user currently logged in at the computing device;
sending a second notification signal to a second server managing a second user account associated with the user currently logged in at the computing device; and
sending a third notification signal to a third server managing security threat investigations to determine a source of the malicious code.

12. The method of claim 7, wherein in response to sending the one or more notification signals to the one or more servers, privileges associated with the user account are revoked.

13. The method of claim 7, wherein in response to sending the one or more notification signals to the one or more servers, an investigation to determine a source of the malicious code is initiated.

14. A non-transitory computer-readable medium storing instructions that when executed by a processor cause the processor to:
receive, from a user, a triggering signal to initiate a suspension procedure, wherein:
the suspension procedure is initiated when a computing device is suspected of being infected by a malicious code, and
when the malicious code is executed, the computing device becomes vulnerable to security threats comprising an unauthorized access to a memory associated with the computing device;
capture one or more states of one or more instructions that are being executed by a processor associated with the computing device, wherein the one or more instructions comprise the malicious code;
prioritize an operation of a kill switch button over the one or more instructions that are being executed by the processor such that the one or more instructions comprising the malicious code are suppressed;
send one or more notification signals to one or more servers managing a user account associated with the user currently logged in at the computing device, indicating that the computing device is suspected of having been infected by the malicious code;
in response to sending the one or more notification signals to the one or more servers, the user account is suspended;
terminate network connections of the computing device such that the computing device is disconnected from other devices; and
erase a particular portion of the memory in which boot up instructions are stored without which the computing device cannot be restarted.

15. The non-transitory computer-readable medium of claim 14, wherein the kill switch button comprises at least one of a physical button, a software button, and a virtual button.

16. The non-transitory computer-readable medium of claim 14, wherein the instructions further cause the processor to halt an operation of the memory such that communications between the memory and the processor are suspended.

17. The non-transitory computer-readable medium of claim 14, wherein the instructions further cause the processor to suspend communications between one or more devices and one or more corresponding ports of the computing device, wherein the one or more devices are connected to the one or more corresponding ports.

18. The non-transitory computer-readable medium of claim 14, wherein in response to sending the one or more notification signals to the one or more servers, privileges associated with the user account are revoked.

* * * * *